United States Patent
Akiba

(10) Patent No.: US 10,515,221 B2
(45) Date of Patent: Dec. 24, 2019

(54) INFORMATION PROCESSING APPARATUS, METHOD OF DISTINGUISHING MOUNTING OF ENCRYPTION UNIT IN INFORMATION PROCESSING APPARATUS, AND STORAGE MEDIUM

(71) Applicant: CANON KABUSHIKI KAISHA, Tokyo (JP)

(72) Inventor: Tomohiro Akiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 15/444,574

(22) Filed: Feb. 28, 2017

(65) Prior Publication Data

US 2017/0262636 A1     Sep. 14, 2017

(30) Foreign Application Priority Data

Mar. 8, 2016     (JP) ................................ 2016-044769

(51) Int. Cl.
*G06F 21/60*     (2013.01)
*G06F 21/44*     (2013.01)
(Continued)

(52) U.S. Cl.
CPC ............ *G06F 21/602* (2013.01); *G06F 21/44* (2013.01); *G06F 21/72* (2013.01); *G06F 21/79* (2013.01);
(Continued)

(58) Field of Classification Search
CPC ........ G06F 21/44; G06F 21/602; G06F 21/72; G06F 21/53; G06F 12/14; G06F 21/70; H04L 63/1408; H04L 9/32
See application file for complete search history.

(56) References Cited

U.S. PATENT DOCUMENTS

| | | | | |
|---|---|---|---|---|
| 6,215,764 B1* | 4/2001 | Wey | ..................... | G06F 1/3209 |
| | | | | 370/216 |
| 6,449,663 B1* | 9/2002 | Carney | ................... | G06F 13/22 |
| | | | | 370/449 |

(Continued)

FOREIGN PATENT DOCUMENTS

| | | |
|---|---|---|
| CN | 105279439 A | 1/2016 |
| JP | 2007-226667 A | 9/2007 |
| JP | 2009-032038 A | 2/2009 |

OTHER PUBLICATIONS

G. Vakulya and G. Simon, "Low power accelerometer based intrusion and tamper detector," 2014 IEEE 11th International Multi-Conference on Systems, Signals & Devices (SSD14), Barcelona, 2014, pp. 1-6. (Year: 2014).*

(Continued)

*Primary Examiner* — Jung W Kim
*Assistant Examiner* — Sameera Wickramasuriya
(74) *Attorney, Agent, or Firm* — Venable LLP

(57) ABSTRACT

An information processing apparatus, equipped with a processor for controlling the information processing apparatus and a storage device, has an encryption unit that encrypts or decrypts data stored in the storage device and data read from the storage device, and determines whether or not the encryption unit is mounted on the same circuit board as a control unit, and changes processing for detecting whether or not a connection between the encryption unit and the control unit is disconnected in accordance with the determination result.

5 Claims, 7 Drawing Sheets

(51) Int. Cl.
*G06F 21/72* (2013.01)
*G06F 21/79* (2013.01)
*G06F 21/85* (2013.01)

(52) U.S. Cl.
CPC ........ *G06F 21/85* (2013.01); *G06F 2212/402* (2013.01)

(56) References Cited

U.S. PATENT DOCUMENTS

| | | | |
|---|---|---|---|
| 8,539,605 B2 | 9/2013 | Ito et al. | |
| 8,797,584 B2 | 8/2014 | Akiba | |
| 8,839,359 B2 | 9/2014 | Ito et al. | |
| 8,891,216 B2* | 11/2014 | Mullins | H04M 3/08 361/58 |
| 9,361,472 B2* | 6/2016 | Takatani | G06F 11/1456 |
| 2007/0204171 A1* | 8/2007 | Ito | G06F 21/80 713/193 |
| 2008/0207126 A1* | 8/2008 | Grushkevich | H04W 74/06 455/41.2 |
| 2008/0278217 A1* | 11/2008 | Hankhofer | H05K 1/0275 327/509 |
| 2010/0017621 A1* | 1/2010 | Crawford | G06F 21/72 713/189 |
| 2010/0031056 A1* | 2/2010 | Harada | G06F 21/602 713/193 |
| 2010/0180343 A1* | 7/2010 | Maeda | G06F 21/51 726/23 |
| 2011/0107132 A1* | 5/2011 | Baba | G06F 11/0745 713/324 |
| 2012/0008770 A1 | 1/2012 | Ito et al. | |
| 2015/0095631 A1* | 4/2015 | Rahardjo | G06F 21/602 713/2 |
| 2016/0036859 A1* | 2/2016 | Zaitsev | G06F 21/78 726/1 |

OTHER PUBLICATIONS

T. W. Arnold et al., "IBM 4765 cryptographic coprocessor," in IBM Journal of Research and Development, vol. 56, No. 1.2, pp. 10:1-10:13, Jan.-Feb. 2012. (Year: 2012).*
Chinese Office Action issued in corresponding Chinese Application No. 201710130899.2, dated Sep. 10, 2019.

* cited by examiner

INFORMATION PROCESSING APPARATUS, METHOD OF DISTINGUISHING MOUNTING OF ENCRYPTION UNIT IN INFORMATION PROCESSING APPARATUS, AND STORAGE MEDIUM

BACKGROUND OF THE INVENTION

Field of the Invention

The present invention relates to an information processing apparatus, a method of distinguishing mounting of an encryption unit in an information processing apparatus, and a storage medium.

Description of the Related Art

In recent years, accumulating a large amount of data in a secondary storage device such as a hard disk drive (hereinafter referred to as HDD) and performing various control by using the data is becoming universal in embedded apparatuses. In such an apparatus, in conjunction with an increase of accumulated data, user-specific data including such data is also increasing. Strict protection is necessary because damage can be wide ranging once user-specific data leaks to the outside. One method of protection is to encrypt such data. By encrypting data, it is possible to prevent a leakage of the data even if a secondary storage device that was mounted on an apparatus gets stolen for example, because data stored in the secondary storage device cannot be easily decrypted.

In a case when encrypting data stored in an HDD which typifies such a secondary storage device, the four methods below can be considered.

(1) Encryption using software (2) Encryption by a hard disk controller (hereinafter referred to as an HDC) in which an encryption module is integrated (3) Encryption by an encryption module attached between an HDC and an HDD (4) Encryption by an encryption module integrated within an HDD As an example of (4) described above, there are products that comply with an Opal Subsystem Class (hereinafter referred to as Opal) that Trusted Computer Group established.

In an embedded apparatus to which an HDD is mounted, there are cases in which the above described method (3) is taken, because a high speed operation is desired, because usage of an encryption function is changed to necessary/unnecessary by a user, and in order to avoid requiring a special HDC, and the like. For the method (3), there is an advantage in that it means that the encryption module can be used commonly in many products. However, because the HDC and the encryption module are separated in the method (3), mutual authentication between them is needed and it is necessary to confirm that the HDC and the encryption module are a legitimate combination.

Japanese Patent Laid-Open No. 2007-226667 recites a data processing apparatus which performs encryption/decryption of data after having performed a mutual authentication of the HDC and the encryption module. However, in this document, even after confirming the combination of the HDC and the encryption module, it is necessary to continuously monitor whether the connection between the encryption module and an HDD is disconnected so that the HDD is not extracted and used. It is necessary that a configuration be taken such that data of the HDD cannot be accessed as long as authentication is not performed again, in a case where it is detected that the connection between the encryption module and the HDD is disconnected.

As described above, after having performed a mutual authentication between the HDC and the encryption module, it is possible to perform data communication therebetween, and during that time, it is possible to protect data of a user by continuously processing to detect a disconnection of the connection with the HDD.

Because such encryption modules met both cost and user needs, they were often externally attachable optional components in the past. However, in recent years, there are increasingly cases in which an encryption module is mounted as standard equipment due to heightened security consciousness. As a result, there are cases in which an HDC and an encryption module are mounted on the same circuit board. In this way, an encryption module, whether externally attached or integrated (onboard mounting), is used as a common component.

When attempting to disconnect the HDC and the encryption module in a state in which the HDC and the encryption module are mounted onto the same circuit board, it is necessary to reconstruct the circuit pattern on the circuit board and to pull off the encryption module from the circuit board. Thus, in a case when these are mounted onto the same circuit board, it becomes impossible to extract an encryption module in an easy way such as simply replacing cables. Accordingly, in such a case, mutual authentication between an HDC and an encryption module, and detection of a disconnection of a connection ceases to be necessary processing. In particular, it is necessary that processing for detecting that a connection is disconnected be made to be optimal processing as necessary because it influences the performance of data encryption/decryption processing in the encryption module.

SUMMARY OF THE INVENTION

An aspect of the present invention is to eliminate the above-mentioned problems with the conventional techniques.

A feature of the present invention is to provide a technique of reducing the influence of detection processing by changing processing for detecting a disconnection with the encryption unit in accordance with if a control unit and an encryption unit are mounted onto the same circuit board or if that is not the case.

According to a first aspect of the present invention, there is provided an information processing apparatus equipped with a storage device, comprising: an encryption unit that encrypts or decrypts data stored in the storage device and data read from the storage device; a memory device that stores a set of instructions; and at least one processor that executes instructions stored in the memory device to: determine whether or not the encryption unit is mounted on the same circuit board as the processor; and change processing for detecting whether or not a connection between the encryption unit and the processor is disconnected in accordance with a determination result.

According to a second aspect of the present invention, there is provided a method of distinguishing a mounting of an encryption unit in an information processing apparatus that has a control unit including a processor and a storage device, and to which the encryption unit, for encrypting or decrypting data that is stored in the storage device and data that is read from the storage device, can be mounted, the method comprising: determining whether or not the encryption unit is mounted on the same circuit board as the control unit; detecting whether or not a connection between the encryption unit and the control unit is disconnected; and changing processing for the detecting in accordance with a determination result.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

In the present embodiment, although detailed description is given for an example of a case in which an information processing apparatus according to the present invention is applied to an image forming apparatus, the information processing apparatus according to the present invention is not limited to such an image forming apparatus, and can be applied to various electronic devices that use a computer and a storage device, communication apparatuses and general PCs.

First Embodiment

Figure 1:
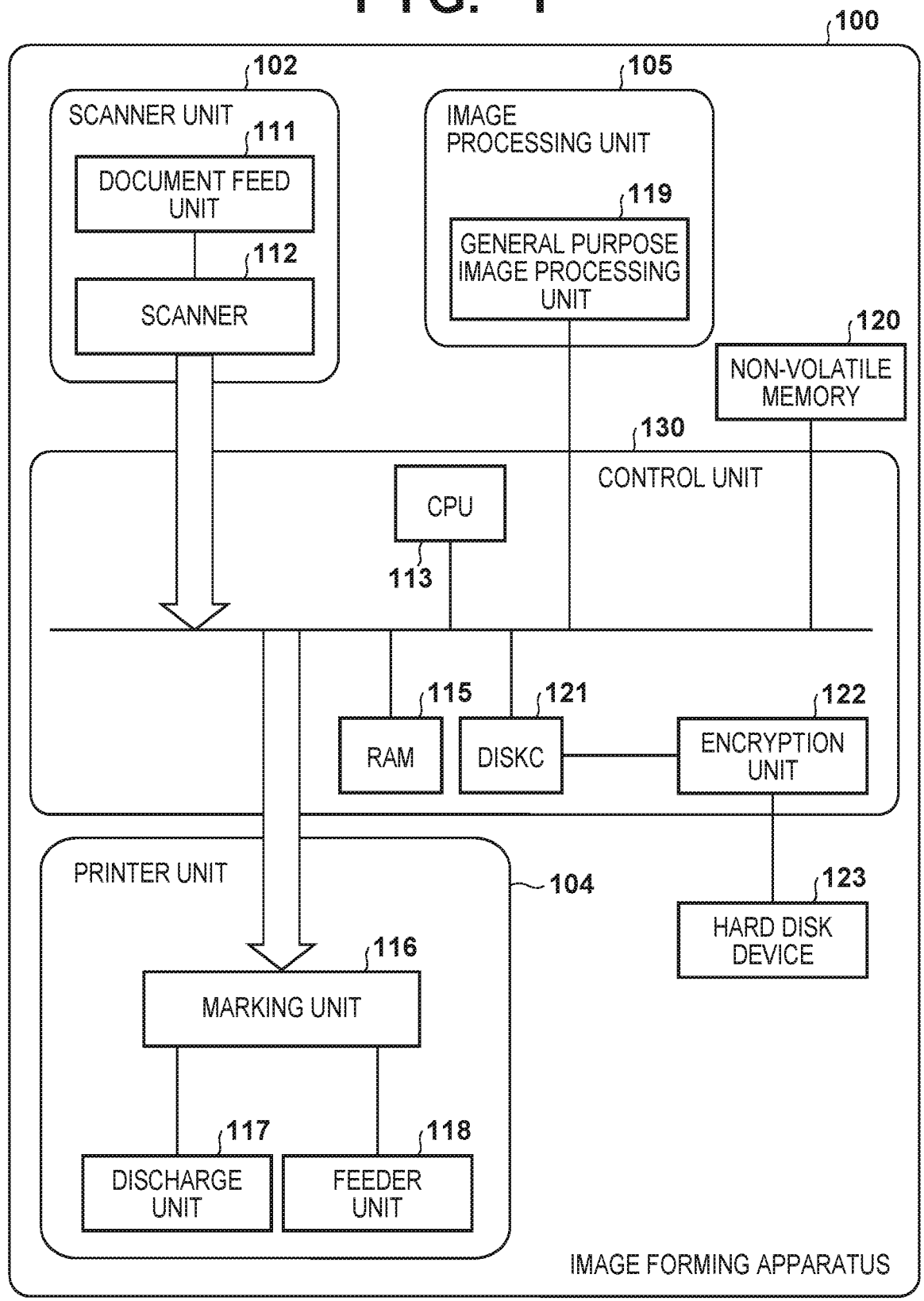
FIG. 1 is a block diagram for describing a configuration of an image forming apparatus according to a first embodiment of the present invention.

FIG. 1 is a block diagram for describing a configuration of an image forming apparatus 100 according to a first embodiment of the present invention.

The image forming apparatus 100 has a scanner unit 102, a printer unit 104, an image processing unit 105, a non-volatile memory 120, a hard disk drive (HDD) 123, and a control unit 130. The scanner unit 102 optically reads an image of an original and converts it to a digital image. The scanner unit 102 has a document feed unit 111 which stacks and feeds a batch of originals one sheet at a time to a scanner 112, and the scanner 112 which optically scans, reads, and converts an image of an original to digital image data, and image data generated by the scanner 112 is transmitted to the control unit 130.

The printer unit 104 prints an image onto a paper based on digital image data. The printer unit 104 is equipped with a feeder unit 118 which stacks, accommodates, and consecutively feeds sheets one at a time from a bundle of sheets, a marking unit 116 which prints an image onto a sheet that is fed from the feeder unit 118, and a discharge unit 117 for discharging sheets after printing.

The control unit 130 is connected to each previously described unit and controls operations by the image forming apparatus 100 by outputting these data items and control signals. Specifically, the control unit 130 temporarily saves the image data received from the scanner unit 102 to a RAM 115. After this, a scanning of an original and a saving of data completes by storing image data to the hard disk drive 123. Also, the control unit 130 can read image data from the hard disk drive 123 and temporarily save it to the RAM 115, and cause the printer unit 104 to print the image by outputting the image data from the RAM 115 to the printer unit 104.

The image processing unit 105 performs various image processing. The image processing unit 105 has a general purpose image processing unit 119, and after performing processing such as reduction, for example, of image data saved in the RAM 115 by the general purpose image processing unit 119, the image processing unit 105 can once again save the image data in the RAM 115.

The non-volatile memory 120 is a storage device which can hold stored data and hold setting information and the like necessary for when the control unit 130 operates even in a case when the power supply of the image forming apparatus 100 is turned off. Also, the image processing unit 105 and the non-volatile memory 120 are configured to be mounted onto the same circuit board as the control unit 130.

The hard disk drive 123 is a device which stores digital image data, control programs, and the like, and is connected to the control unit 130 via a disk controller (DISKC) 121 which is a control unit of the hard disk drive 123 and an encryption unit 122. Here, the disk controller (DISKC) 121 and the encryption unit 122 are configured to be mounted onto the same circuit board as the control unit 130. Data supplied from the disk controller 121 is saved to the hard disk drive 123 after being encrypted by the encryption unit 122. Also, encrypted data that was read from the hard disk drive 123 is transmitted to the CPU 113 via the disk controller 121 after being decoded by the encryption unit 122. The disk controller 121, the encryption unit 122, and the hard disk drive 123 are connected by a circuit or a cable of a SATA standard which is a standard interface.

Figure 2:
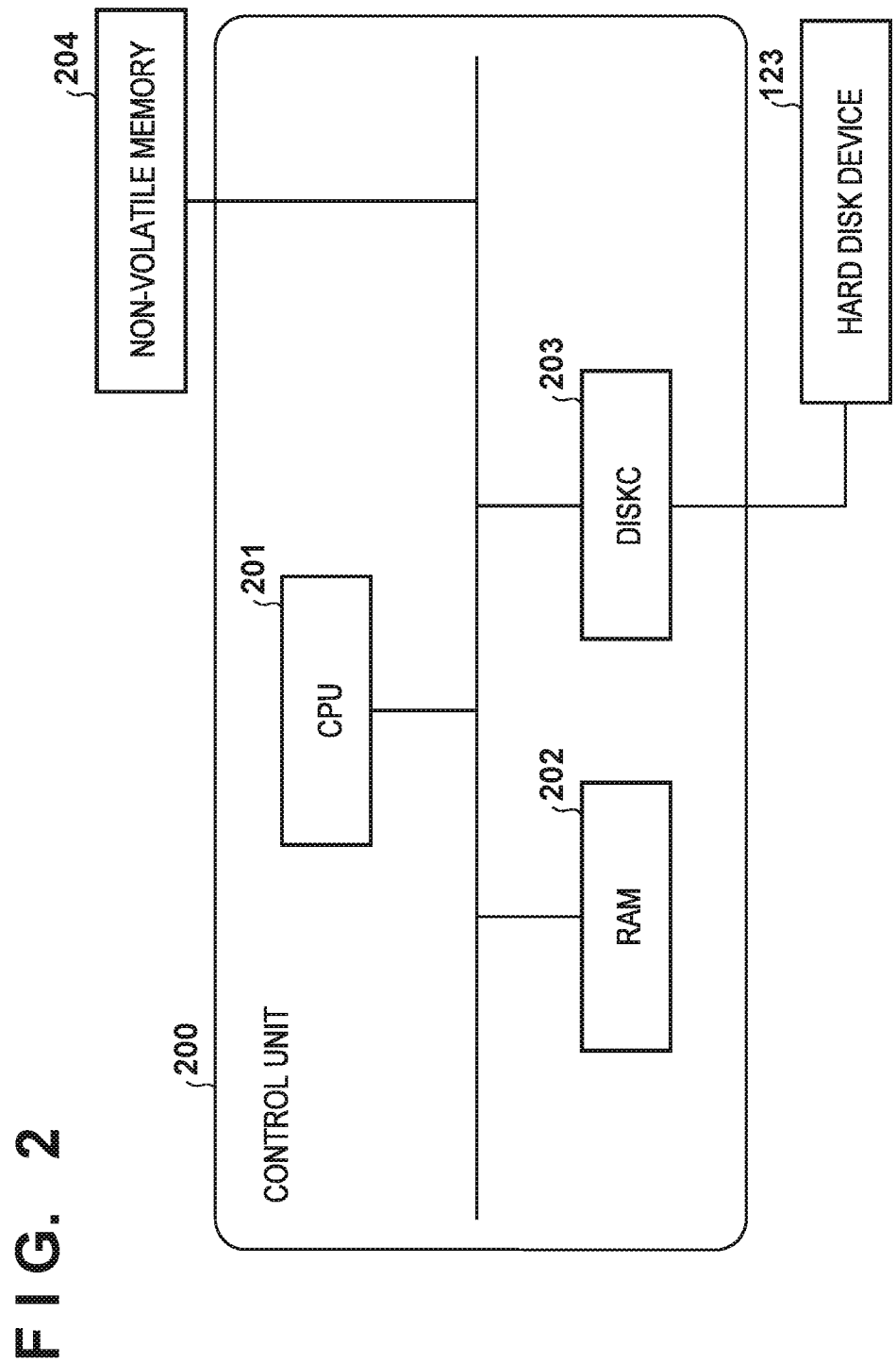
FIG. 2 is a block diagram for describing a configuration of a control unit that does not include an encryption unit.
Figure 3:
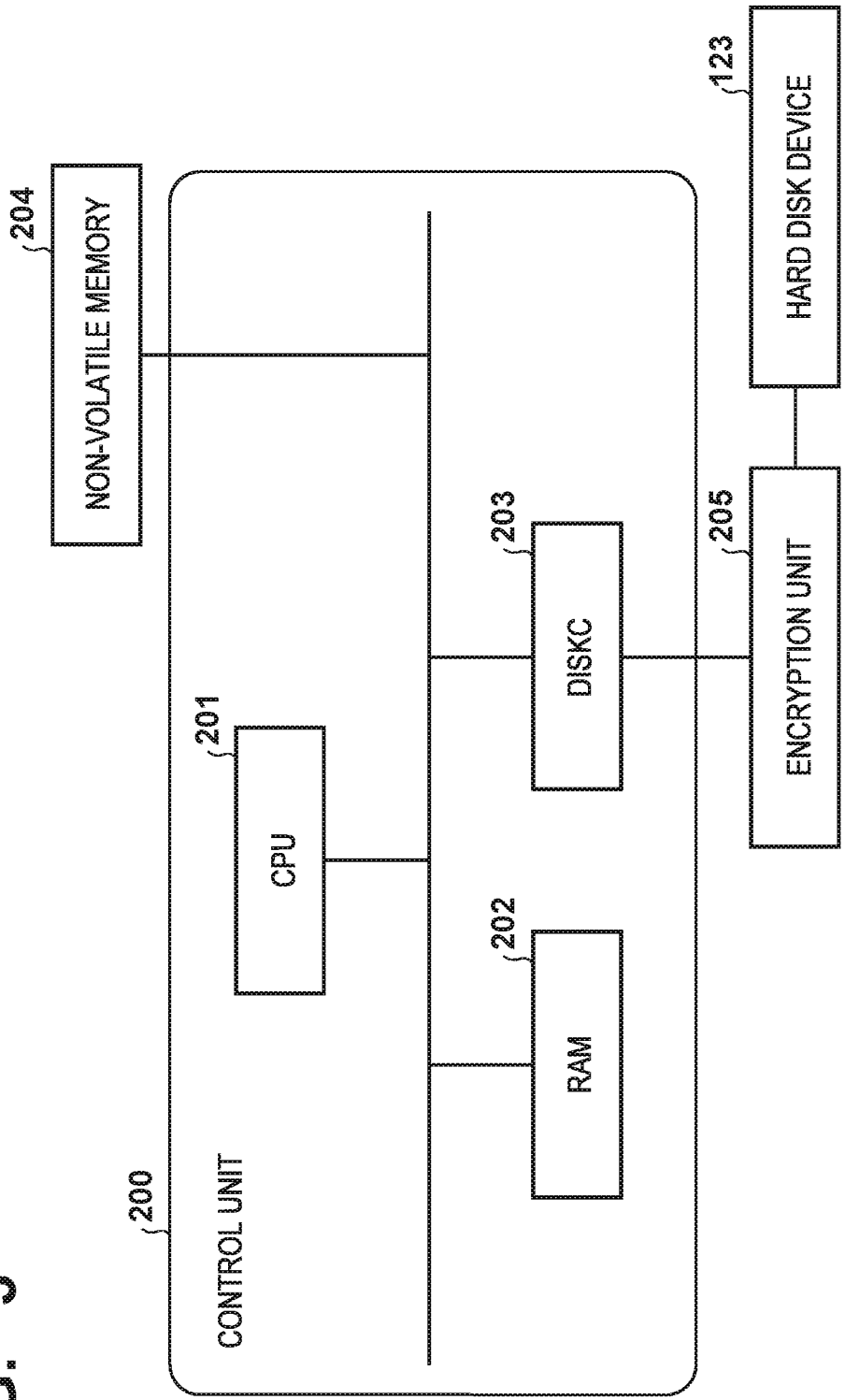
FIG. 3 is a block diagram for describing a configuration of a control unit in which the encryption unit is subsequently added to the configuration of FIG. 2.

FIG. 2 and FIG. 3 are block diagrams for describing configurations of a control unit 200 of a configuration similar to the control unit 130 according to the first embodiment.

FIG. 2 is a block diagram for describing a configuration of the control unit 200 in a case when an encryption unit is not connected to the hard disk drive 123.

The control unit 200 has a CPU 201, a RAM 202, and a disk controller (DISKC) 203 and connects the hard disk drive 123 via the DISKC 203. Also, a non-volatile memory 204 is externally connected to a bus of the CPU 201. In this state, a function for encrypting data to the hard disk drive 123 cannot be used because an encryption unit is not connected.

FIG. 3 is a block diagram for describing a state in which a function for encrypting data to the hard disk drive 123 can be used because an encryption unit 205 is subsequently attached to the configuration of FIG. 2. Portions common to FIG. 2 are denoted by the same reference numerals.

Here, the difference between the control unit 130 of FIG. 1 previously described and the control unit 200 is that the encryption unit 205 is not mounted onto the same circuit board with the control unit 200.

The encryption unit 122 is mounted onto the same circuit board as the control unit 130, as with the control unit 130 of FIG. 1, when configuring such that all users can use the encryption unit.

Meanwhile, when configuring so that only users, for which a security function is desired, can use the encryption unit, the encryption unit 122 is not mounted on the same circuit board, as in the case of the control unit 200 of FIG. 3. Although which configuration to take is determined based on user needs, cost, and the like, it is advantageous that an encryption unit be prepared as a common component because its function is the same.

Figure 4:
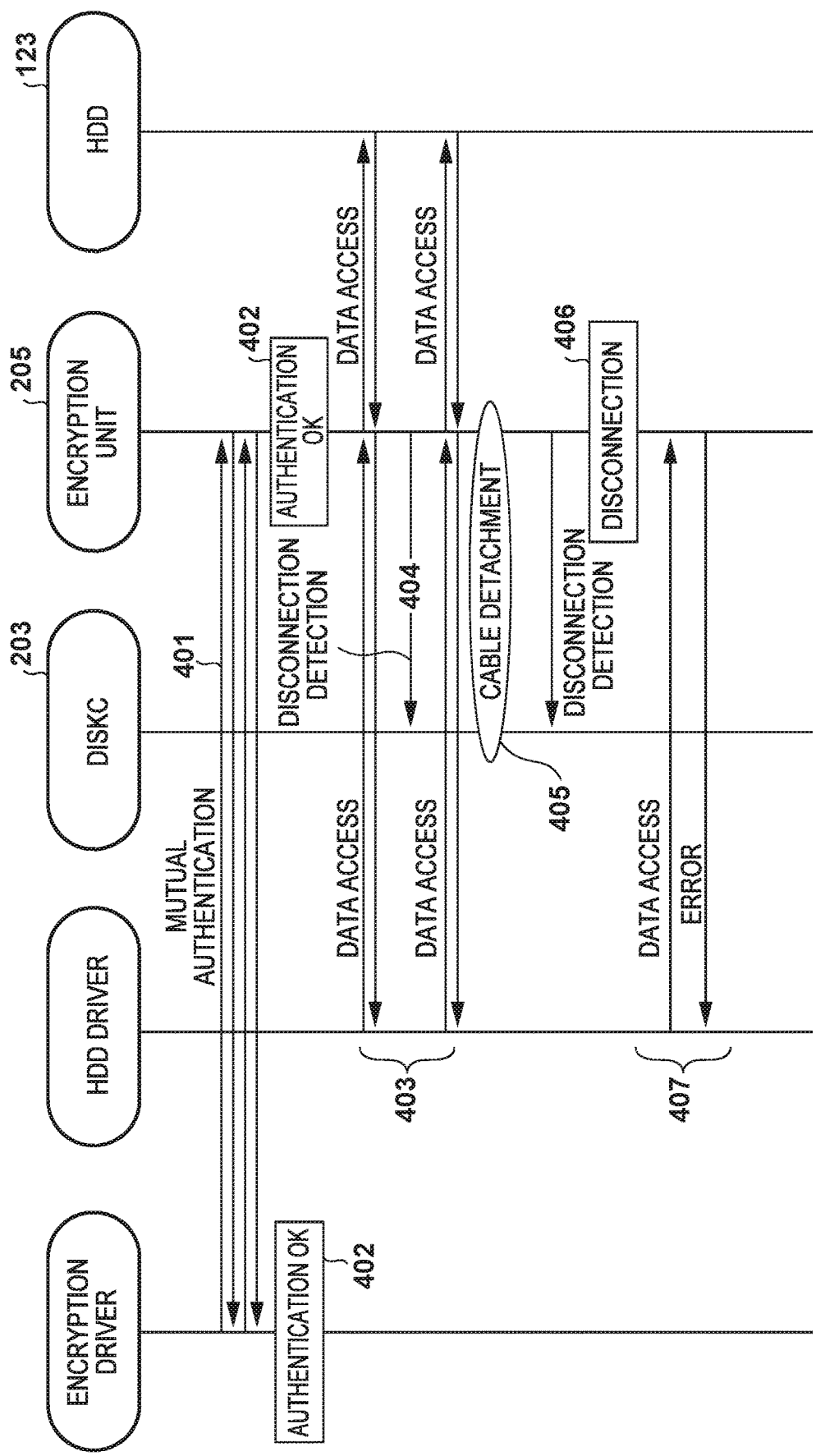
FIG. 4 is a sequence diagram for describing a process for detecting whether a connection between the control unit and a hard disk apparatus is disconnected in the configuration of FIG. 3.

FIG. 4 is a sequence diagram for describing processing for detecting whether or not a connection between the DISKC 203 and the encryption unit 205 is disconnected in the configuration of FIG. 3 for example.

In such a case, firstly, a mutual authentication 401 is performed between the encryption unit 205 and an encryption driver which is realized by software. Then, when the authentication succeeds in reference numeral 402, an exchange of data between the HDD 123 and the control unit 200 via the encryption unit 205 becomes possible as denoted by reference numeral 403. During this time, the encryption unit 205 executes processing to detect of a disconnection with the DISKC 203 regularly as indicated by reference numeral 404.

Then, for example, when a disconnection by a cable detachment or the like, as denoted by reference numeral 405, is detected, disconnection processing is executed in reference numeral 406 and thereafter, an error occurs upon data access from the HDD driver to the HDD 123 as denoted by reference numeral 407. Also, this is realized in software similarly to an HDD driver or an encryption driver.

Figure 5:
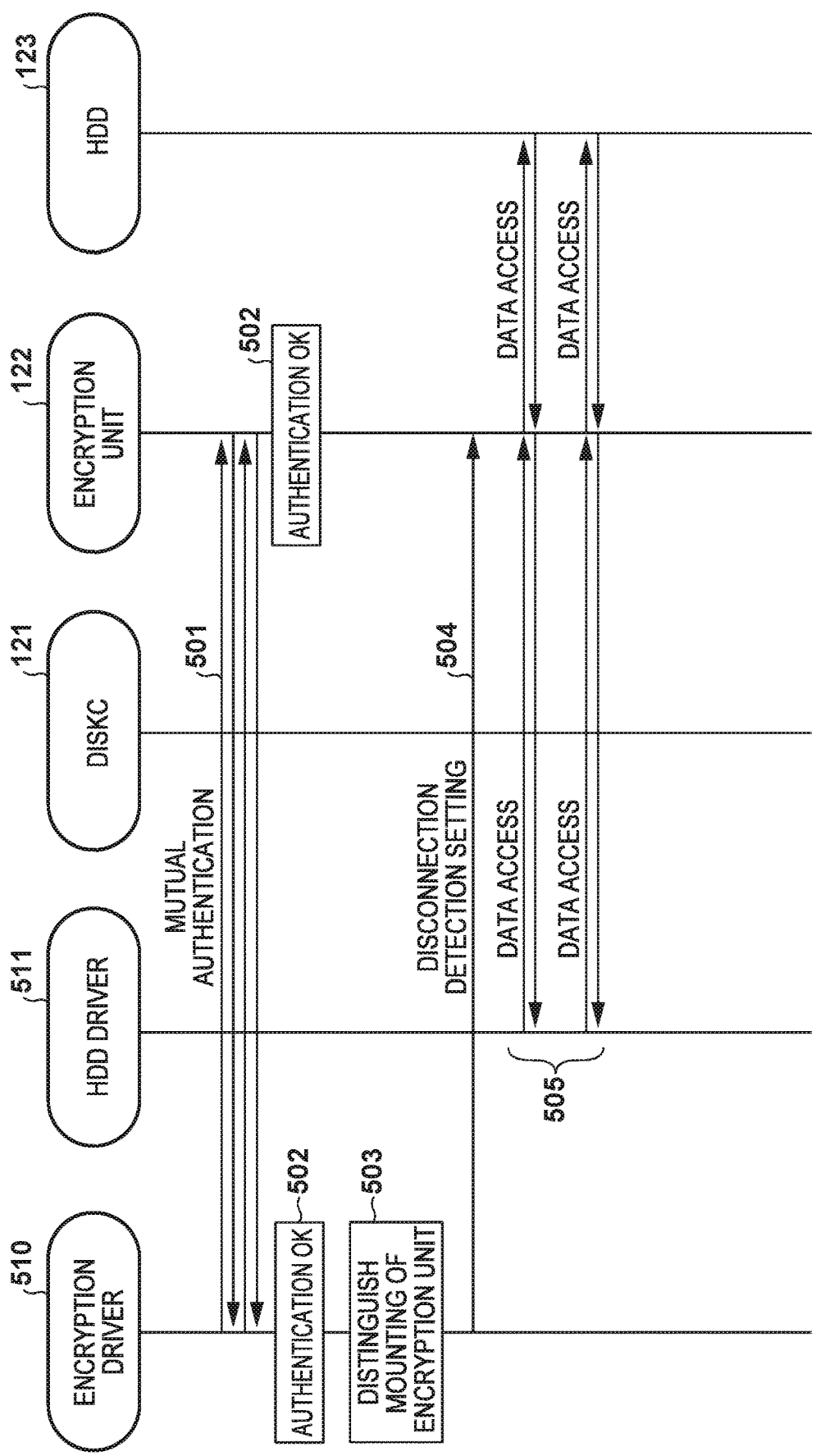
FIG. 5 is a sequence diagram for describing a process for detecting whether a connection between DISKC and the encryption unit is disconnected in the image forming apparatus according to the first embodiment.

FIG. 5 is a sequence diagram for describing a process for detecting whether a connection between the DISKC 121 and the encryption unit 122 is disconnected in the image forming apparatus 100 according to the first embodiment.

When the power supply of the image forming apparatus 100 is turned on, an encryption driver 510, which is one part of a control program, performs a mutual authentication by communicating with the encryption unit 122 as denoted by reference numeral 501. Although there is no particular restriction regarding the authentication method, a challenge-response authentication or a more simple password authentication is possible. The challenge-response authentication is a mechanism by which an authentication can be safely performed even in an environment in which there is the possibility that communication content will be monitored, and by the addition of random numbers to the authentication information that is exchanged, the authentication information cannot be obtained even if monitoring is performed.

In this way, when the authentication succeeds, the encryption driver 510 and the encryption unit 122 enter an authenticated state respectively as denoted by reference numeral 502. Subsequently, the encryption driver 510 determines whether or not the encryption unit 122 is mounted onto the same circuit board (onboard) in reference numeral 503. Details of this determination processing are described later.

Here, it is determined whether or not the encryption unit 122 is mounted on the same circuit board, and a setting for detecting a disconnection with the encryption unit 122 is performed in reference numeral 504 in accordance with the determination result. In this way, after performing the disconnection detection setting and other settings, it becomes possible to perform a normal exchange of data between an HDD driver 511 and the HDD 123 as denoted by reference numeral 505. Here, regarding data between the HDD driver 511 and the encryption unit 122, plain text data is exchanged, and regarding data between the encryption unit 122 and the hard disk drive 123, encrypted data is exchanged.

Also, in FIG. 5, after a connection with the encryption unit 122 is disconnected, disconnection processing is executed and thereafter, an error occurs upon data access from the HDD driver 511 similarly to in the case of FIG. 4.

Figure 6:
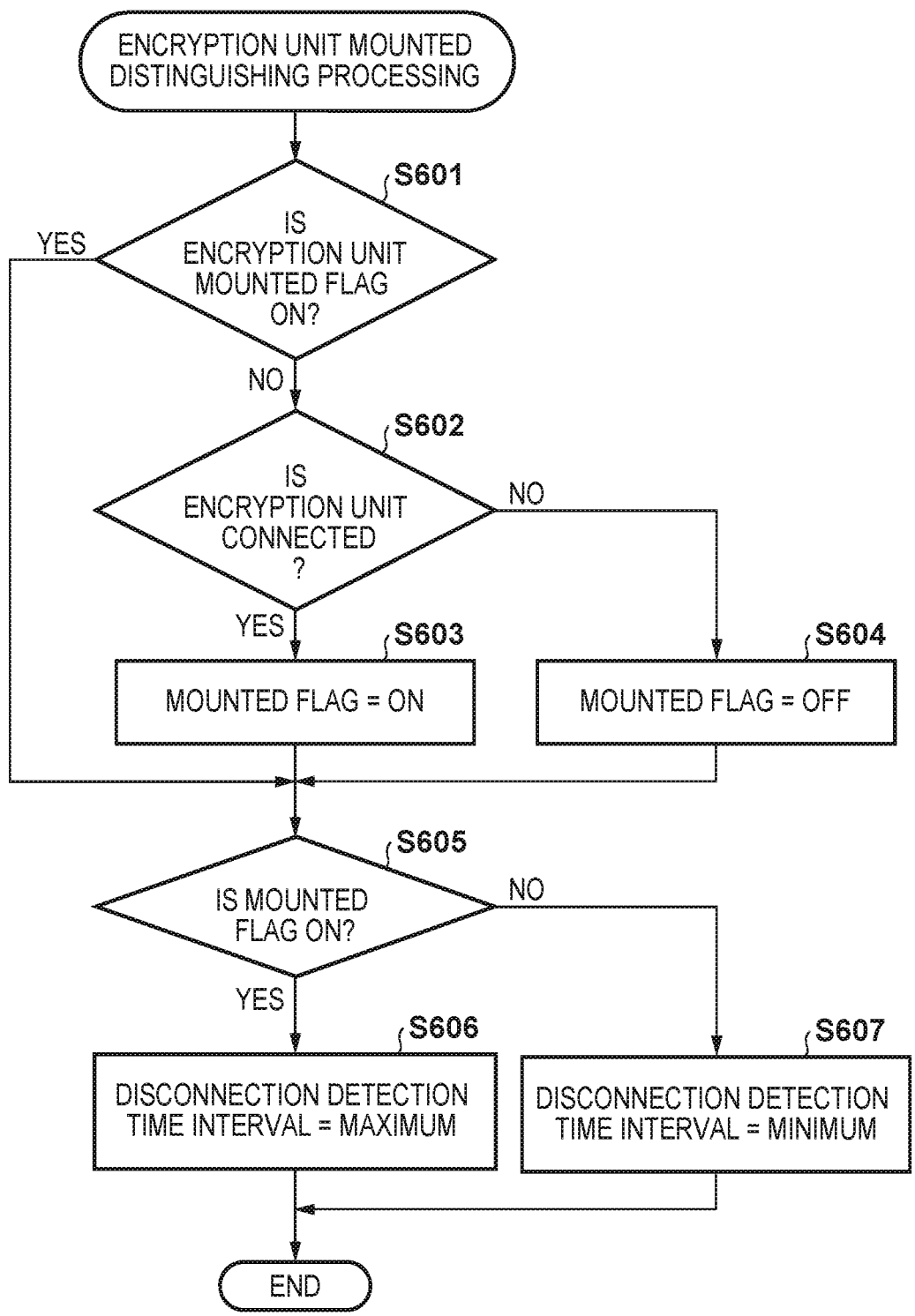
FIG. 6 is a flowchart for describing processing for detecting whether a connection with the encryption unit is disconnected in the image forming apparatus according to the first embodiment.

FIG. 6 is a flowchart for describing processing for detecting whether a connection with the encryption unit 122 is disconnected in the image forming apparatus 100 according to the first embodiment. This processing corresponds to the processing 503 for distinguishing mounting of the encryption unit and the processing 504 for detecting disconnection of the encryption unit of FIG. 5. Also, a program for executing this processing is installed to the HDD 123 for example, and this processing is achieved by, at a time of execution, the program being deployed to the RAM 115 by the CPU 113 and executed by the CPU 113.

Firstly, in step S601, the CPU 113 references an encryption unit mounted flag (hereinafter referred to as a mounted flag) and determines whether or not the mounted flag is set. This mounted flag is stored in the non-volatile memory 120 for example, and in a case when the power supply of the image forming apparatus 100 is turned on for the first time, the mounted flag is off. In step S601, although the processing advances to step S605 if the mounted flag is determined to be on, when this is not the case, the processing advances to step S602. In step S602, the CPU 113 determines whether or not the encryption unit 122 is connected. Although this determination is based on a determination in accordance with a signal of a port to which the encryption unit 122 is connected, or whether or not data that the encryption unit 122 has could be obtained, or the like, for example, there is no particular limitation to this. Here, the processing proceeds to step S603 if it is determined in step S602 that the encryption unit 122 is connected, and the CPU 113 sets the mounted flag to on, specifically, sets that the encryption unit 122 is mounted on the same circuit board as the control unit 130, and the processing advances to step S605. Meanwhile, the processing proceeds to step S604 if it is determined in step S602 that the encryption unit 122 is not connected, and the CPU 113 sets the mounted flag to off, specifically, sets the encryption unit 122 to not mounted, and the processing advances to step S605.

In step S605, the CPU 113 determines whether or not the mounted flag is on. Here, the processing advances to step S606 if it is determined in step S605 that the mounted flag is on, specifically, that the encryption unit 122 is mounted on the same circuit board as the control unit 130, the CPU 113 sets a time interval for detecting whether or not a connection with the encryption unit 122 is disconnected to a maximum (every 1 minute, for example), and the processing ends. Meanwhile, the processing advances to step S607 if the mounted flag is determined to be off in step S605, the CPU 113 sets the time interval in which whether or not a connection with the encryption unit 122 is disconnected is detected to a minimum (every 1 second, for example), and the processing ends.

By the first embodiment, as described above, a time period for determining whether or not a connection between the encryption unit and the DISKC is disconnected is made to be shorter, in a case where the encryption unit is not mounted onto the same circuit board as the control unit, on the other hand, this time period is made to be longer in a case where the encryption unit is mounted on the same circuit board. In this way, in a case where the encryption unit and the control unit are mounted onto the same circuit board, it is possible to reduce an influence on encryption and decoding processing by making the time period of the disconnection determination processing longer because the encryption unit cannot be easily removed.

Second Embodiment

Figure 7:
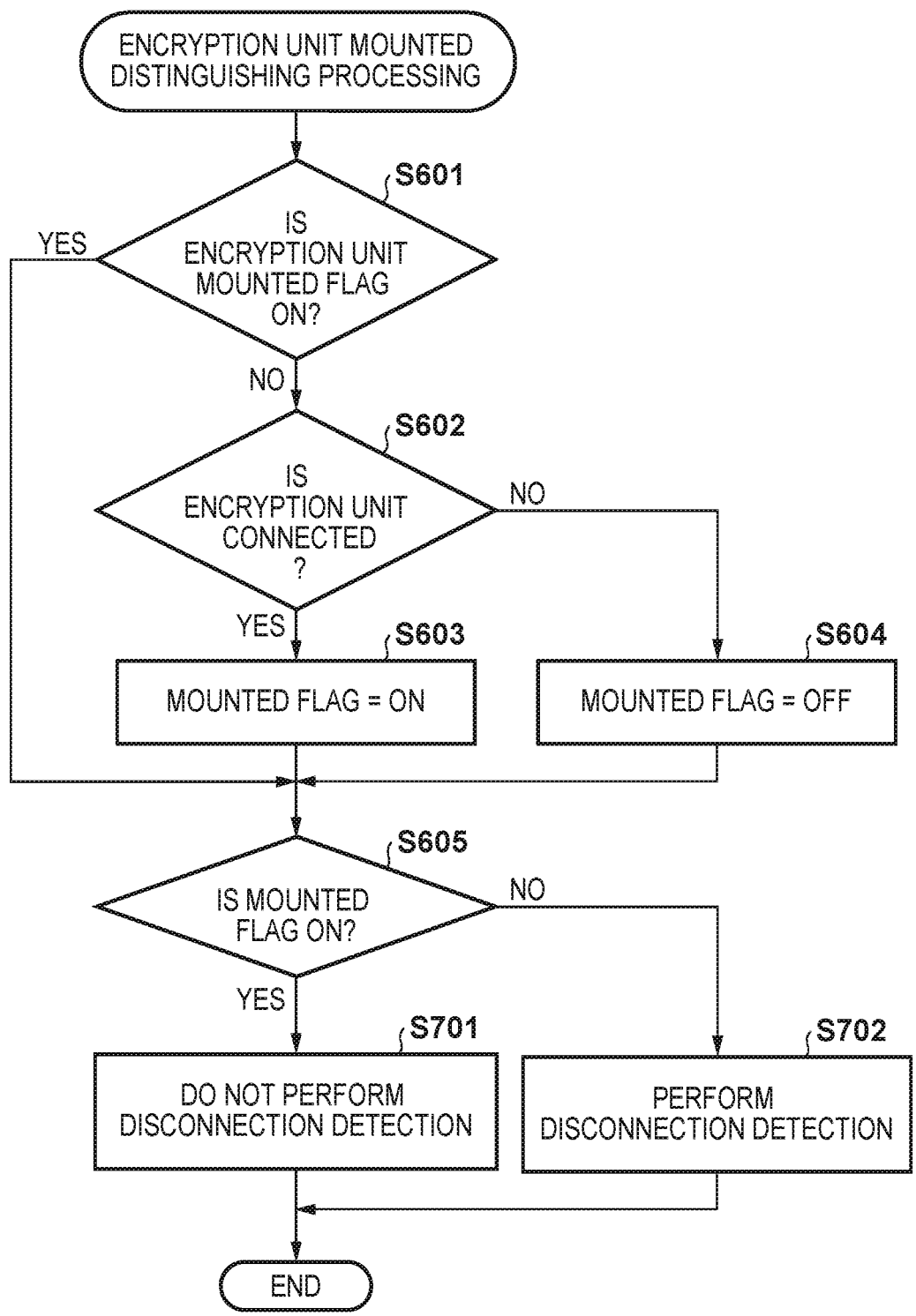
FIG. 7 is a flowchart for describing processing for detecting whether a connection with the encryption unit is disconnected in the image forming apparatus according to a second embodiment.

Next, description is given for a second embodiment of the present invention with reference to FIG. 7. Also, because configuration of the image forming apparatus 100 according to the second embodiment is the same as the previously described first embodiment, the description thereof is omitted.

In step S606 of FIG. 6, although the time interval for detecting whether or not a connection with the encryption unit 122 is disconnected is set to be a maximum, in the second embodiment, description is given in an example in which processing for detecting whether or not the connection is disconnected is made to be unnecessary.

FIG. 7 is a flowchart for describing detection setting processing for detecting whether a connection with the encryption unit 122 is disconnected in the image forming apparatus 100 according to the second embodiment of the present invention. This processing corresponds to the processing 503 for distinguishing mounting of the encryption unit and the processing 504 for detecting disconnection of the encryption unit of FIG. 5. Also, a program for executing this processing is installed to the HDD 123 for example, and this processing is achieved by, at a time of execution, the program being deployed to the RAM 115 by the CPU 113 and executed by the CPU 113.

Here, processing common to the previously described FIG. 6 is denoted by the same reference numerals and description of processing thereof is omitted. When the CPU 113 determines, in step S605, that the mounted flag is on, specifically, that the encryption unit 122 is mounted on the same circuit board as the control unit 130, the processing advances to step S701. In step S701, the CPU 113 sets the processing for detecting whether or not the connection is disconnected to unnecessary and ends the processing. On the other hand, if the CPU 113 determines, in step S605, that the mounted flag is off, specifically, that the encryption unit 122 is not mounted on the same circuit board as the control unit 130, the processing advances to step S702. In step S702, the CPU 113 sets the processing for detecting whether or not the connection is disconnected to enabled and ends the processing.

By the second embodiment, as described above, processing for determining whether or not a connection between the encryption unit and the DISKC is disconnected is eliminated in a case where the encryption unit is mounted onto the same circuit board as the control unit, and that processing is performed in a case where the encryption unit is not mounted on the same circuit board. In this way, in a case when the encryption unit and the control unit are mounted onto the same circuit board, it is possible to reduce an influence on encryption and decoding processing by making the disconnection determination processing unnecessary because the encryption unit cannot be easily removed.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-044769, filed Mar. 8, 2016 which is hereby incorporated by reference herein in its entirety.

What is claimed is:

1. An information processing apparatus equipped with a storage device, comprising:
   an encryption unit that encrypts or decrypts data stored in the storage device and data read from the storage device;
   a storage device controller that controls the storage device;
   a memory device that stores a set of instructions; and
   at least one processor that executes instructions stored in the memory device to:
   perform processing, at a predetermined time interval, for detecting whether or not a connection between the encryption unit and the storage device controller is disconnected;
   determine whether or not the encryption unit and the storage device controller are mounted on a same circuit board; and
   (i) perform the processing at a first time interval in a case that it is determined that the encryption unit and the storage device controller are not mounted on the same circuit board, and (ii) perform the processing at a second time interval longer than the first time interval, or not perform the processing, in a case that it is determined that the encryption unit and the storage device controller are mounted on the same circuit board.

2. The information processing apparatus according to claim 1, wherein the at least one processor determines whether or not the encryption unit and the storage device controller are mounted on the same circuit board based on information indicating whether or not the encryption unit and the storage device controller are mounted on the same circuit board.

3. The information processing apparatus according to claim 2, wherein the information is stored in a non-volatile memory connected to the processor.

4. A method of distinguishing a mounting of an encryption unit in an information processing apparatus that has a control unit including a storage device and a storage device controller that controls the storage device, and to which the encryption unit, for encrypting or decrypting data that is stored in the storage device and data that is read from the storage device, can be mounted, the method comprising:

performing processing, at a predetermined time interval, for detecting whether or not a connection between the encryption unit and the storage device controller is disconnected;

determining whether or not the encryption unit and the storage device controller are mounted on a same circuit board;

performing the processing at a first time interval in a case that it is determined that the encryption unit and the storage device controller are not mounted on the same circuit board; and performing the processing at a second time interval longer than the first time interval, or not performing the processing, in a case that it is determined that the encryption unit and the storage device controller are mounted on the same circuit board.

5. A non-transitory computer-readable storage medium storing a program for causing a processor to execute a method of distinguishing a mounting of an encryption unit in an information processing apparatus that has a control unit including a storage device and a storage device controller that controls the storage device, and to which the encryption unit, for encrypting or decrypting data that is stored in the storage device and data that is read from the storage device, can be mounted, the method comprising:

performing processing, at a predetermined time interval, for detecting whether or not a connection between the encryption unit and the storage device controller is disconnected;

determining whether or not the encryption unit and the storage device controller are mounted on a same circuit board;

performing the processing at a first time interval in a case that it is determined that the encryption unit and the storage device controller are not mounted on the same circuit board; and performing the processing at a second time interval longer than the first time interval, or not performing the processing, in a case that it is determined that the encryption unit and the storage device controller are mounted on the same circuit board.

\* \* \* \* \*